Patented July 1, 1952

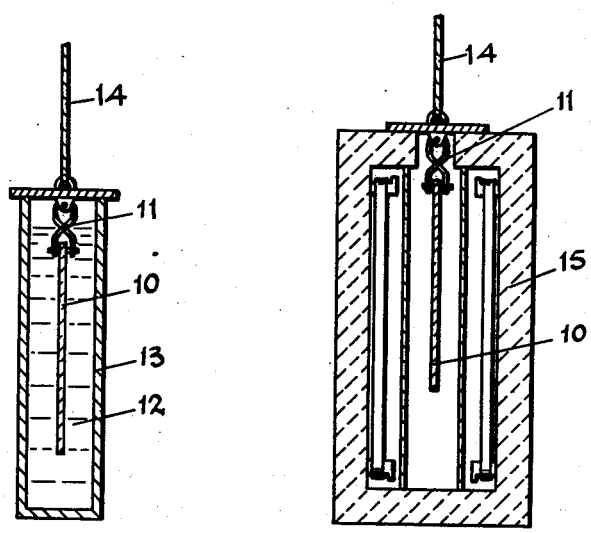
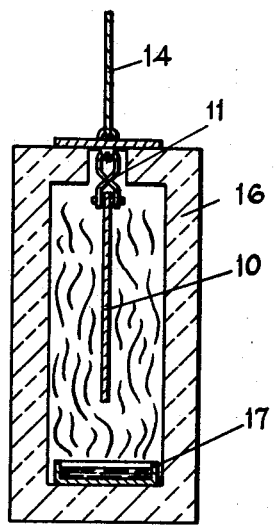

2,602,032

UNITED STATES PATENT OFFICE 2,602,032

ELECTRICALLY CONDUCTING SURFACE AND METHOD FOR PRODUCING SAME

Romey A. Gaiser, Toledo, Ohio, assignor to Libbey-Owens-Ford Glass Company, Toledo, Ohio, a corporation of Ohio Application August 19, 1946, Serial No. 691,636

19 Claims. (Cl. 117—69)

The present invention relates to electrically conducting coatings. More particularly, it has to do with transparent and substantially colorless films of this character, and with increasing the electrical conductivity of such films.

The practical advantages of a transparent film or coating that will satisfactorily conduct an adequate amount of electricity are multitudinous. For example, glass is the best all-purpose, transparent substance known, but in its normal, solid state it is such a poor conductor of electricity that it is widely used as an electrical insulating material.

However, by the use of a transparent, electrical conducting film, either one or both surfaces of a perfectly transparent glass sheet can be made capable of conducting a substantial current of electricity without interfering with its natural properties of light transmission, clarity of vision, and absence of color. Similarly, figured, colored, and other glass articles of distinctive appearance may have all or any part of their surfaces treated, to render them electrically conducting, without noticeably altering their original appearance.

Transparent, colorless, electrically conducting films are disclosed in an application of Gaiser et al., Serial No. 513,144, filed December 6, 1943, and now abandoned, and in two Gaiser applications, Serial Nos. 654,473 and 654,474, both filed May 14, 1946. In these earlier filed cases the electrically conducting film is a transparent coating of tin oxide, applied directly to the surface of a glass body, by coating or fuming it with a tin halide.

Such films, when applied to the body will reduce the electrical resistance of the glass from 1,000,000,000,000 ohms per square area, to around 50,000 ohms. Or, differently expressed, they will increase the electrical conductivity of the untreated glass some twenty million times. Films of this kind were produced on a commercial basis, for the army and navy during the late war, and proved extremely valuable for purposes of electrostatic dissipation.

The electrical resistance of these direct contact, transparent, tin oxide films could be further reduced, according to the disclosure of the previous applications, by subjecting the glass surface to the action of the tin halide for a longer period of time. Practically invisible coatings having a coefficient of electrical resistance as low as 30,000 ohms per square area could be produced in this manner; however, increased exposure to the tin halide also acted to develop color and to reduce transparency in the resulting film.

Now it is the aim of the present invention to provide a new and different method of reducing the electrical resistance in a transparent electrically conducting film, and one which has little or no effect on the transparency of the film.

Briefly stated, this novel method comprises depositing a transparent base coating derived from silica on the glass or other surface to be treated, and then applying the electrically conducting coating over the base coat.

In other words, another important object of the invention is the provision of a multilayer film comprising a transparent silica type base coat, and a transparent top coat of an electrical conducting material. By this means, resistances of less than 1000 ohms per square area can be produced on glass surfaces without decreasing the light transmission to an objectionable degree.

Other objects and advantages of the invention will become more apparent during the course of the following description, when taken in connection with the accompanying drawings.

In the drawings, wherein like numerals are employed to designate like parts throughout the same:

Fig. 1 is a vertical section through a tank containing a silicate solution, showing a sheet of glass being dipped therein;

Fig. 2 is a vertical sectional view through a heating oven with a glass sheet suspended therein; and Fig. 3 is a vertical section through a fuming chamber, showing a glass sheet being exposed to the vapors of a tin chloride.

The novel feature of my invention resides primarily in the fact that the electrically conducting film employed is not applied directly to the surface to be treated. Instead, it is deposited over a thin, transparent base coat that is interposed between the surface and the film. Preferably this base coat is silica or a silicate, and its effects are quite surprising.

For one thing, the presence of the silica derived base coat will increase the conductivity of the electrically conducting film from 10 to 23 times what it would be if applied to the uncoated surface. Moreover, in the case of glass at least, a surface coated with an electrically conducting film over a silicate base coat will have superior light transmission to one that has the electrically conducting film in direct contact.

In practicing the invention, I have applied transparent, silica derived, base coats to glass sheets in a number of different ways. Thermal vacuum evaporation of fused silica and crystalline quartz, hydrolysis of silicon tetrachloride, and hydrolysis of organic silicates such as ethyl silicate were all used as the means of securing a silica film on a glass surface that would not interfere with the desirable properties of the finished product.

However, the best method that has been found to date involves the use of water solutions of silicates; for example, sodium silicate or potassium silicate.

It is important to note that when silicate solutions are diluted with water a hydrosol is formed, which changes slowly in the laboratory atmosphere to a hydrogel. This change is accompanied by a slow change in the silicate structure and I feel that it has an important bearing on the final properties of the film.

To illustrate, I prefer for the purpose a solution of one part of potassium silicate and seven parts of water by volume, with the potassium silicate having an alkali-silica ratio of 1:3.92-32° Baumé.

Now, if a light of clean glass is dipped into this solution immediately after it is prepared, and then filmed with tin chloride, a lower resistance than would be obtained without the silica treatment is noted. However, if the silicate solution is first allowed to stand for four hours, and the glass then treated in exactly the same manner described above, it will be found that an even greater reduction in electrical resistance is obtained.

The four-hour time interval between mixing the silicate solution and using it to apply a base coat to the glass has been found to be a very good one. Nevertheless, I do not wish to give the impression that this is necessarily the very best interval that can be used. As a matter of fact, we have noted, in plotting time intervals against increased conductivity factors, that rather symmetrical curves are obtained which show peaks at several time intervals.

Nevertheless, we have standardized on the four-hour "aging" interval in our production and, for the purposes of illustration, the procedure which I usually follow in practicing the method of the invention is set forth below:

Clean glass is immersed in an approximately four-hour old silicate solution composed of sodium silicate and/or potassium silicate in a water medium. Rather wide variation in both the silicate and water content can be made without destruction of the beneficial results of the process. However, I prefer to utilize a room temperature solution of one part of "Kasil #2" in seven parts of distilled water by volume.

The dipping procedure is shown diagrammatically in Fig. 1. As indicated there, a glass sheet 10, after cleaning, is suspended from tongs 11 and then lowered into the silicate solution 12 contained in a suitable tank 13. The dipped sheet is mechanically withdrawn from the solution, as by the cable 14, at a uniform and rather slow rate, to insure the maximum uniformity of coating. After removal from the bath the sheet, coated with the silicate solution, is dried for a few minutes, whereupon it is ready to receive the electrically conducting coating.

The invention is not restricted to the use of any specific transparent, electrically conducting film, nor to any specific method of producing such a film. Thus, any of the methods, and their resulting films, that have been disclosed in the three applications referred to above may be used in completing the multilayer coating.

Ordinarily, I prefer the method of application 513,144, wherein a heated surface is exposed to the vapors of stannic tetrachloride, as the means of applying the electrically conducting film. Thus, following this process, the coated and dried sheet 10' is introduced into an oven 15, as shown in Fig. 2, which is preferably maintained at a temperature around 1200 degrees Fahrenheit.

Within the furnace 15, the sheet 10' should be heated to substantially the point of softening of the glass. Because glass varies and has no precise softening point, it is not practical to give any exact temperature requirements; but, in securing colorless, transparent, electrical conducting surfaces on average coated glass, it has been found that exposure of the glass to temperatures between 550 to 700 degrees centigrade for from two to ten minutes, followed by immediate exposure to the vapors of the tin halide, give very satisfactory results. Perhaps the best general statement that can be given is that the glass should be heated sufficiently to be relieved of strains without change of dimensions or contour.

After proper heating, the glass sheet 10 is removed from the furnace 15 and introduced into the fuming chamber 16 of Fig. 3, where it can be exposed to the fumes of stannic tetrachloride. Stannic tetrachloride is an extremely volatile liquid, and, by pouring a sufficient quantity into a container 17 in the bottom of the chamber 16, the atmosphere in the chamber will become saturated with the vapors of the compound. The hot glass sheet 10 is suspended in this saturated atmosphere and moved gently back and forth, for a period of time varying from four to twelve seconds. The average time is about six seconds. But the important thing is that the coated glass be exposed to the stannic chloride vapors long enough to secure an electrical conducting surface, and be removed before any noticeable fog, cloud or color appears.

After removal from the fuming chamber, the glass may be cooled in the air at normal temperature, it may be slowly annealed, or, it may be suddenly chilled to place its outer surfaces under compression and the interior under tension.

The chemical action which takes place when the hot coated glass is exposed to the vapors of the tin halide is not completely understood, but it is believed that it is the presence of stannic oxide that is responsible for the peculiar properties of the top film. As to the base film, this is applied as a silicate, but under the heat necessary to the fuming process it is appreciated that the final undercoat may be of silica.

At any rate, glass treated in the manner just described will be transparent, colorless, and will possess electrical conductivity superior to glass treated with stannic tetrachloride alone. That this is actually the case has been proven thousands of times in the course of my work by the simple expedient of covering only one-half of a glass sheet with a silica derived coating and then applying the electrically conducting film over the entire sheet.

When this has been done the electrical resistance of the two adjacent areas, one with the base film and the other without it, is measured. By dividing the resistance of the area having the electrically conducting film over the base coat, a factor is obtained which denotes the number of times greater conductivity the base coated area has.

Factors of the order of 10 are common and factors as high as 23+ are often noted.

Such increased conductivity is extremely important in transparent, electrically conducting films because it permits higher amperages to be directed through the films with lower voltages.

It is to be understood that the form of the invention herewith shown and described is to be taken as a preferred embodiment of the same, and that various changes may be resorted to without departing from the spirit of the invention or the scope of the subjoined claims. For example, intermediate coatings might be applied between the top and base coat.

I claim:

1. The method of producing an electrically conducting coating on a surface, which comprises applying a solution of a silicate to said surface, heating said surface to substantially its point of softening, and then applying a tin halide in fluid form.

2. The method of increasing the electrical conductivity of a transparent electrically conducting film on a surface, which comprises forming a transparent coating of silica on said surface before applying the electrically conducting film.

3. The method of increasing the electrical conductivity of a transparent electrically conducting film on a surface, which comprises first applying a transparent coating of a silicate on said surface and then applying the electrically conducting film.

4. The method of increasing the electrical conductivity of a transparent electrically conducting film on a surface, which comprises first applying a transparent coating of potassium silicate on said surface and then applying the electrically conducting film.

5. The method of increasing the electrical conductivity of a transparent electrically conducting film on a surface, which comprises applying a transparent coating of sodium silicate on said surface before applying the electrically conducting film.

6. The method of producing a transparent electrically conducting coating of relatively low electrical resistance on a surface, which comprises forming a transparent coating of silica on said surface, and then applying a transparent film of tin oxide over said coating.

7. The method of producing a transparent electrically conducting coating of relatively low electrical resistance on a surface, which comprises applying a transparent coating of a silicate on said surface, and then forming a transparent electrically conducting film of tin oxide over said coating.

8. The method of producing a transparent electrically conducting coating of relatively low electrical resistance on a surface, which comprises applying a transparent coating of potassium silicate on said surface, and then forming a transparent electrically conducting film of tin oxide over said coating.

9. The method of producing a transparent electrically conducting coating of relatively low electrical resistance on a surface, which comprises applying a transparent coating of sodium silicate on said surface, and then forming a transparent film of tin oxide over said coating.

10. The method of producing a transparent electrically conducting coating of a relatively low electrical resistance on a glass surface, which comprises coating said surface with a transparent layer of silica, heating the silica coated surface, and then exposing the hot coated surface to the filming action of a tin chloride.

11. The method of producing a transparent electrically conducting coating of a relatively low electrical resistance on a glass surface, which comprises coating said surface with a transparent layer of a silicate, and then exposing said surface while at a temperature approximating its point of softening to the action of a tin chloride in fluid form.

12. The method of producing a transparent electrically conducting coating of a relatively low electrical resistance on a glass surface, which comprises coating said surface with a transparent layer of potassium silicate, heating the coated surface to substantially the softening point of the glass, and then exposing the hot coated surface to the vapors of stannic tetrachloride.

13. The method of producing a transparent electrically conducting coating of a relatively low electrical resistance on a glass surface, which comprises coating said surface with sodium silicate, heating the coated surface to substantially the softening point of the glass, and then exposing the hot coated surface to the vapors of stannic tetrachloride.

14. The method of producing a transparent electrically conducting coating of a relatively low electrical resistance on a vitreous surface, which comprises coating said surface with potassium silicate, heating said coated surface to substantially the softening point of the vitreous material, and then exposing the hot coated surface to the action of a tin chloride in fluid form until said electrically conducting film is formed.

15. The method of producing an electrically conducting coating on a surface of a vitreous body which comprises applying an aged solution of a silicate to said surface, heating the coated surface to a temperature approximating the softening point of the vitreous material of the body, and then applying a tin halide in fluid form to said hot surface.

16. An electrically conducting film of tin oxide on a surface, and a layer of silica between said surface and said film.

17. A transparent electrically conducting film on a surface, comprising a base layer of a silicate and a top layer of electrically conducting tin oxide.

18. A multilayer electrically conducting coating on a surface, comprising a base layer of potassium silicate and a top layer of electrically conducting tin oxide.

19. An electrically conducting film of tin oxide on a surface, and a layer of sodium silicate between said surface and said film.

ROMEY A. GAISER.

REFERENCES CITED

The following references are of record in the file of this patent:

UNITED STATES PATENTS

| Number | Name | Date |
| --- | --- | --- |
| 2,118,795 | Littleton | May 24, 1938 |
| 2,281,474 | Cartwright et al. | Apr. 28, 1942 |
| 2,290,911 | Jones | July 28, 1942 |
| 2,337,460 | French | Dec. 21, 1943 |
| 2,356,553 | Weissenberg | Aug. 24, 1944 |
| 2,429,420 | McMaster | Oct. 21, 1947 |